Figure 1:
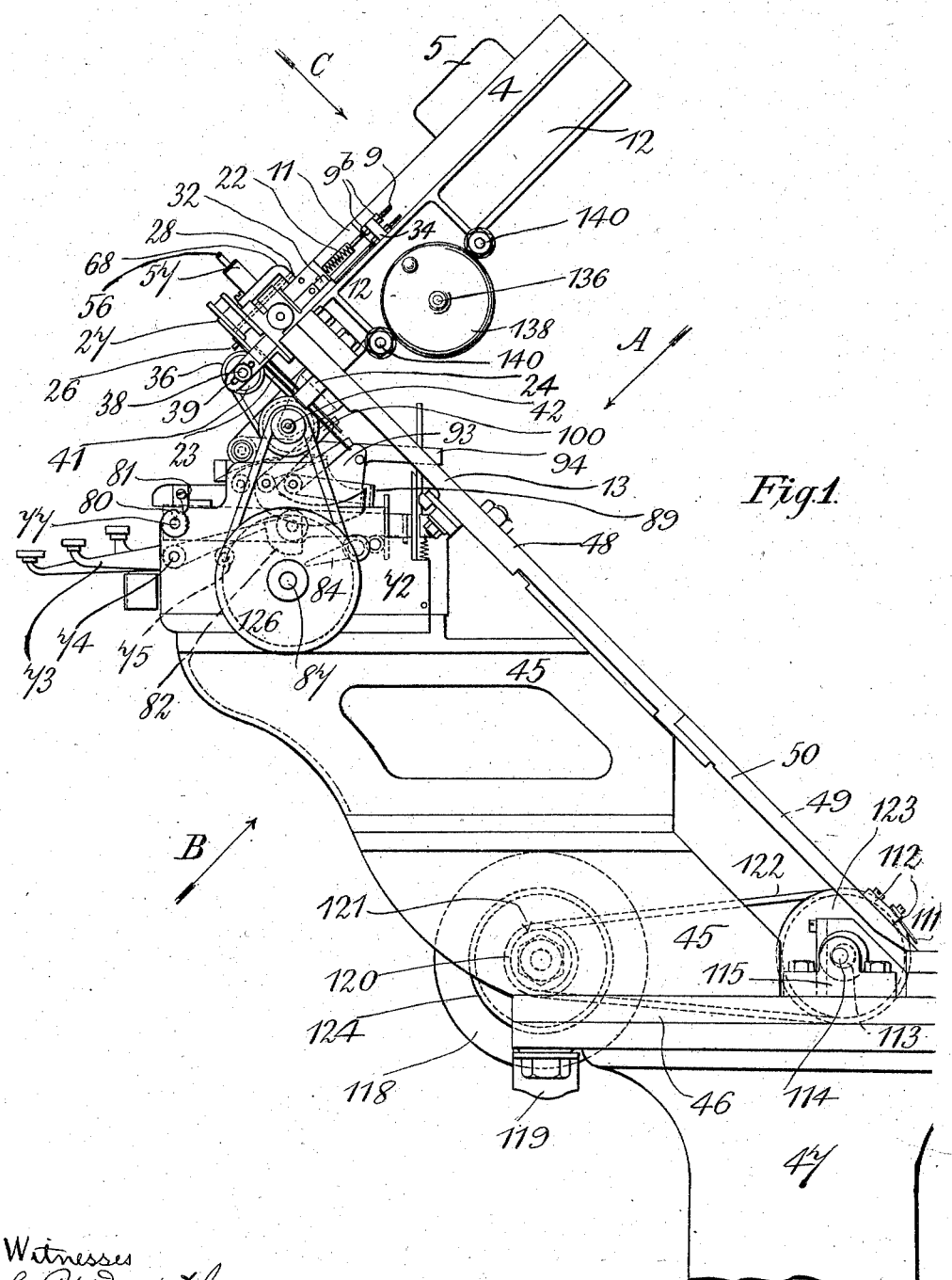

E. A. ADCOCK.
TYPE DISTRIBUTING MACHINE.
APPLICATION FILED DEC. 28, 1908.

966,979.

Patented Aug. 9, 1910.
16 SHEETS—SHEET 1.

Witnesses
C. P. Wright Jr.
A. W. Ehmling

Inventor
E. A. Adcock,
By A. S. Pattison, Atty.

E. A. ADCOCK.
TYPE DISTRIBUTING MACHINE.
APPLICATION FILED DEC. 28, 1908.

966,979.

Patented Aug. 9, 1910.
16 SHEETS—SHEET 4.

E. A. ADCOCK.
TYPE DISTRIBUTING MACHINE.
APPLICATION FILED DEC. 28, 1908.

966,979.

Patented Aug. 9, 1910.
16 SHEETS—SHEET 7.

E. A. ADCOCK.
TYPE DISTRIBUTING MACHINE.
APPLICATION FILED DEC. 28, 1908.

966,979.

Patented Aug. 9, 1910.
16 SHEETS—SHEET 8.

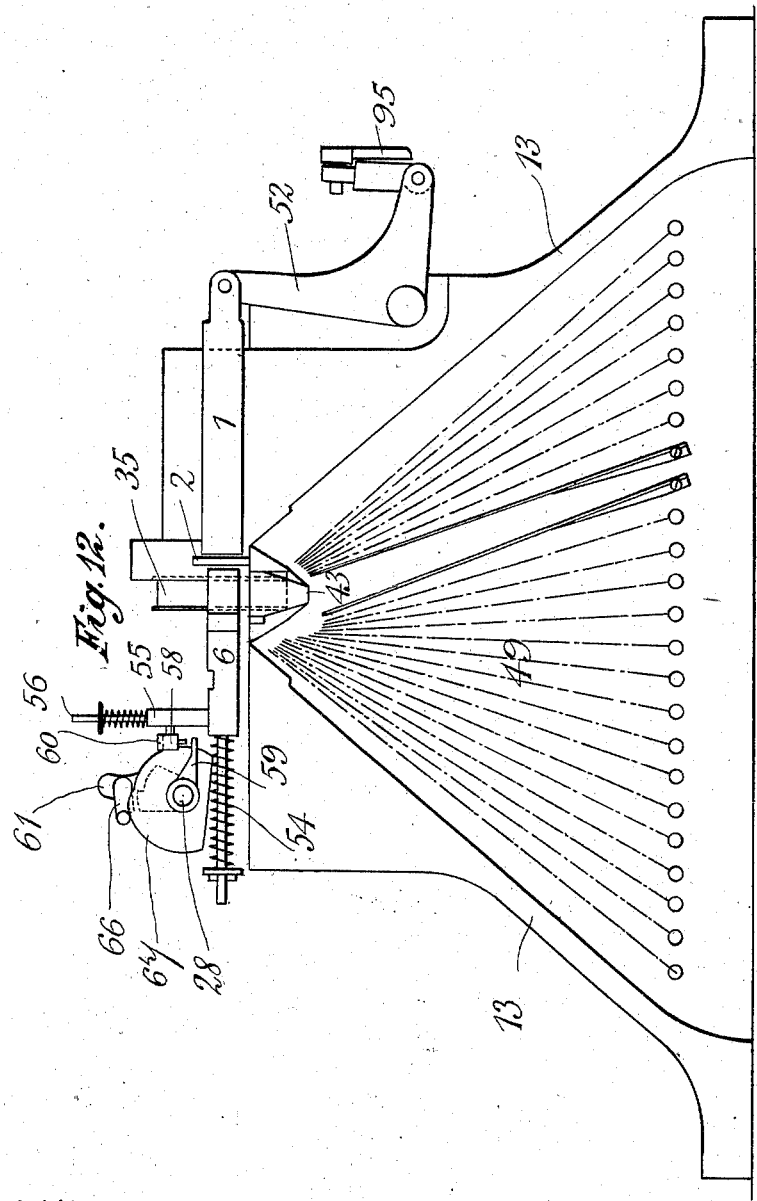

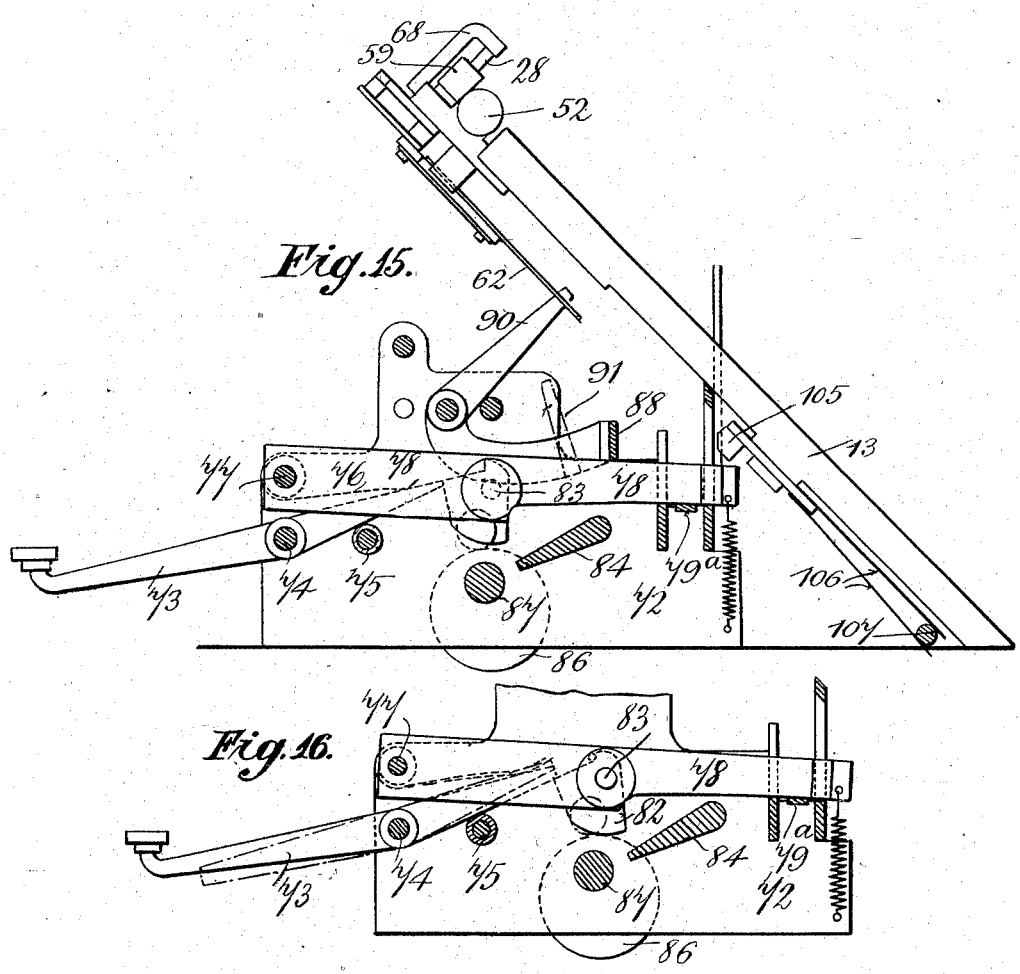

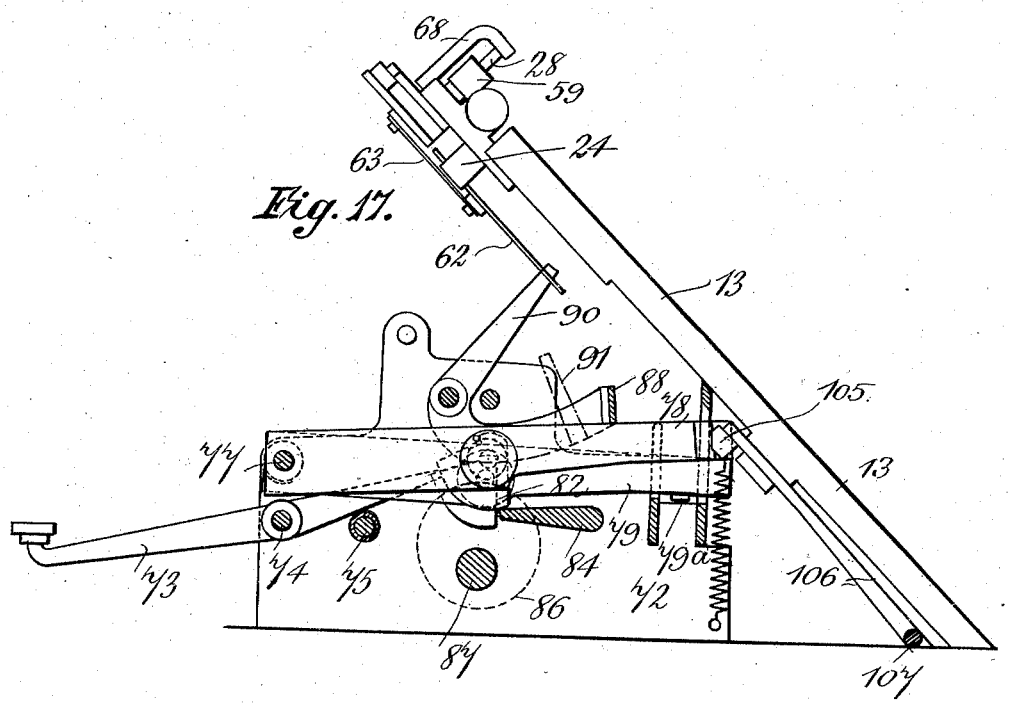

E. A. ADCOCK.
TYPE DISTRIBUTING MACHINE.
APPLICATION FILED DEC. 28, 1908.
966,979.
Patented Aug. 9, 1910.
16 SHEETS—SHEET 12.
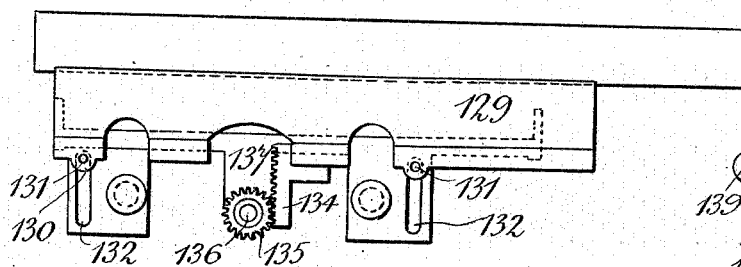
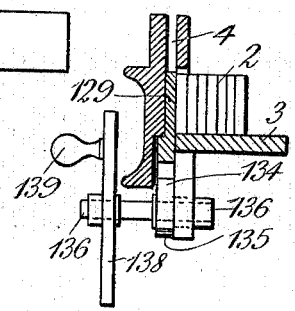
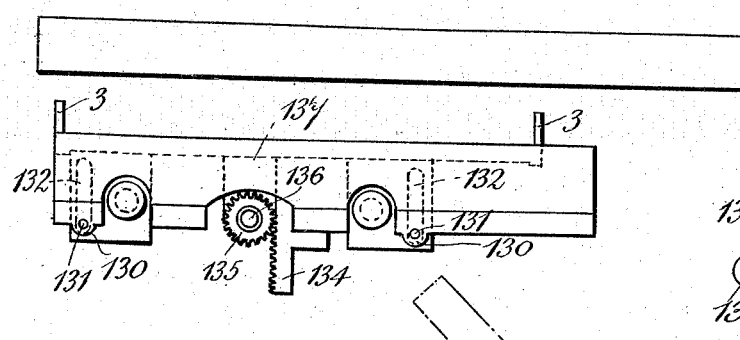
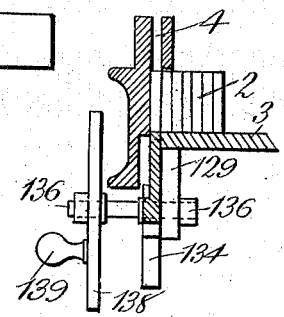
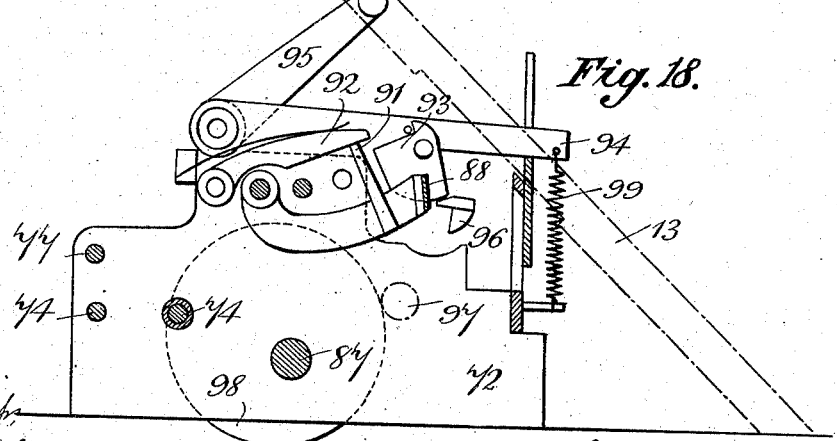

E. A. ADCOCK.
TYPE DISTRIBUTING MACHINE.
APPLICATION FILED DEC. 28, 1908.

966,979.

Patented Aug. 9, 1910.
16 SHEETS—SHEET 13.

E. A. ADCOCK.
TYPE DISTRIBUTING MACHINE.
APPLICATION FILED DEC. 28, 1908.
966,979.
Patented Aug. 9, 1910.
16 SHEETS—SHEET 14.
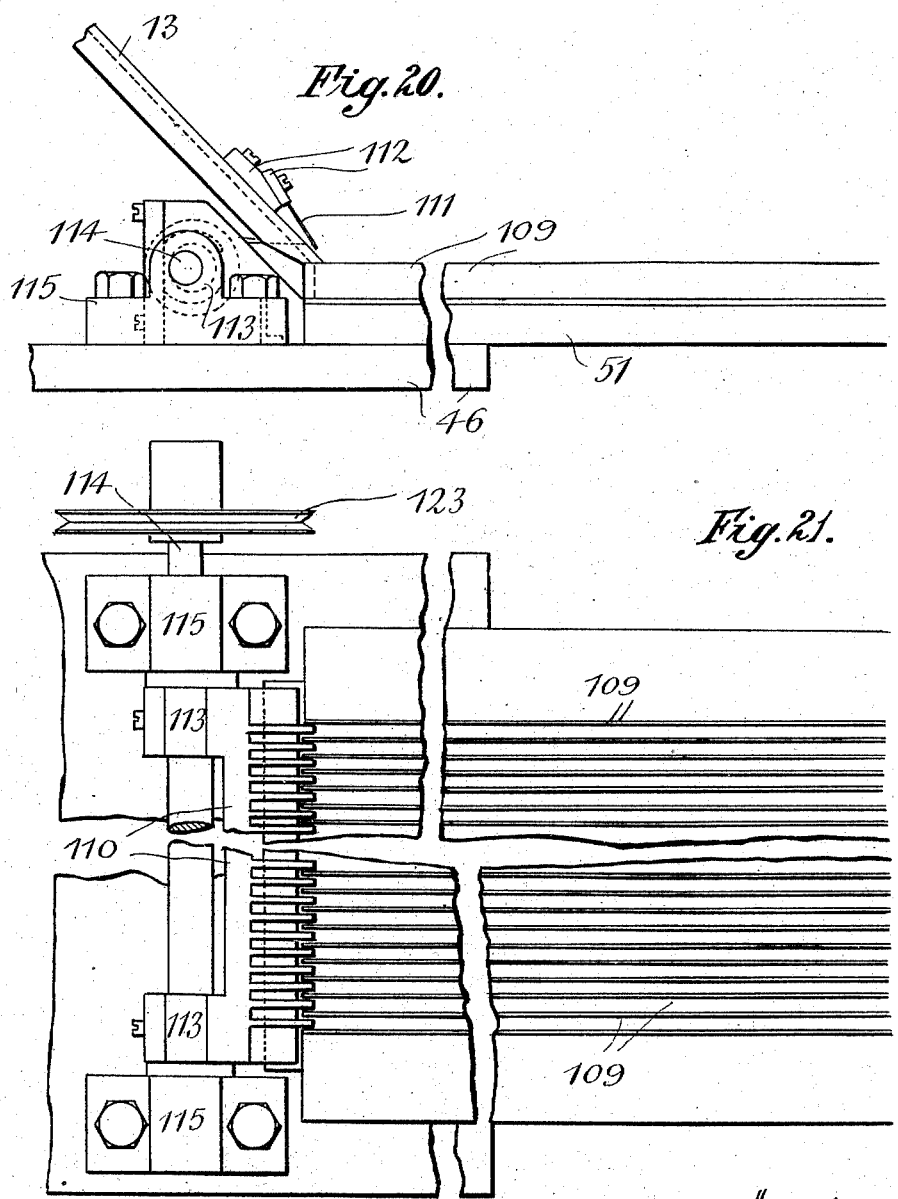

E. A. ADCOCK.
TYPE DISTRIBUTING MACHINE.
APPLICATION FILED DEC. 28, 1908.
966,979.
Patented Aug. 9, 1910.
16 SHEETS—SHEET 15.
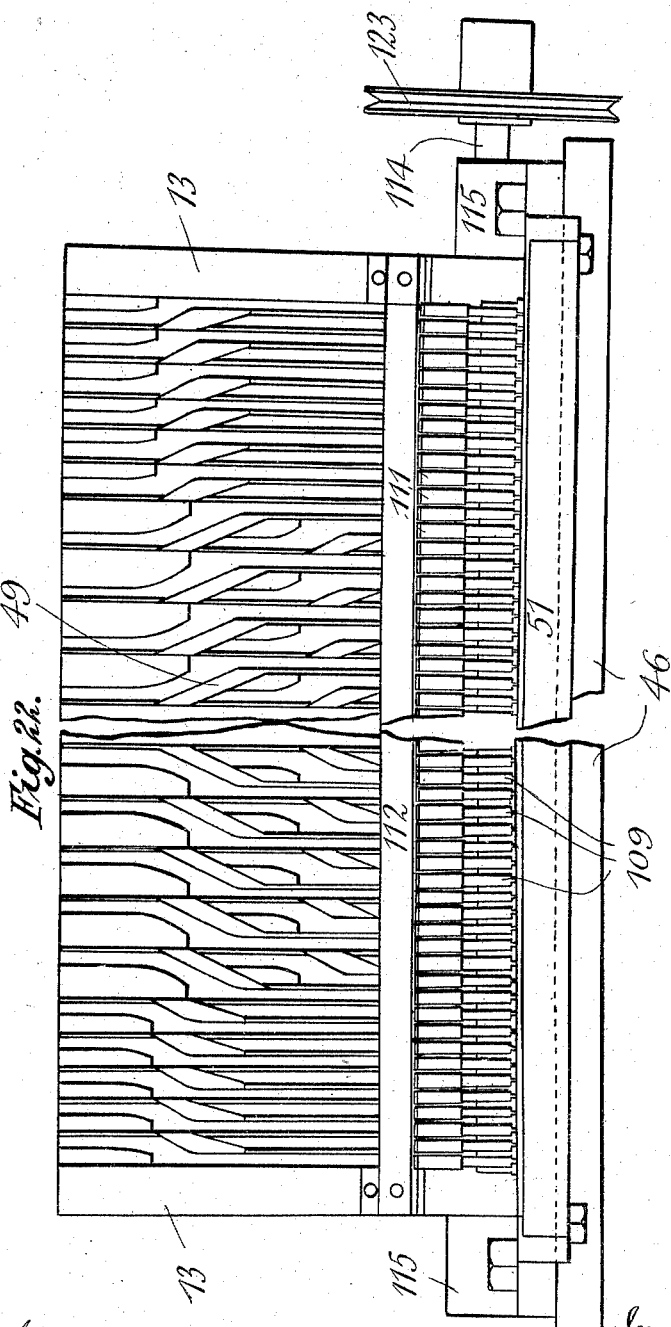

E. A. ADCOCK.
TYPE DISTRIBUTING MACHINE.
APPLICATION FILED DEC. 28, 1908.
966,979.
Patented Aug. 9, 1910.
16 SHEETS—SHEET 16.
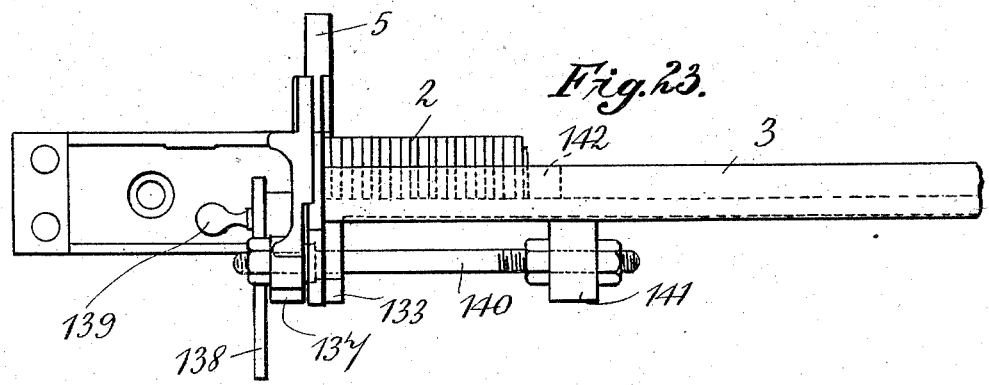
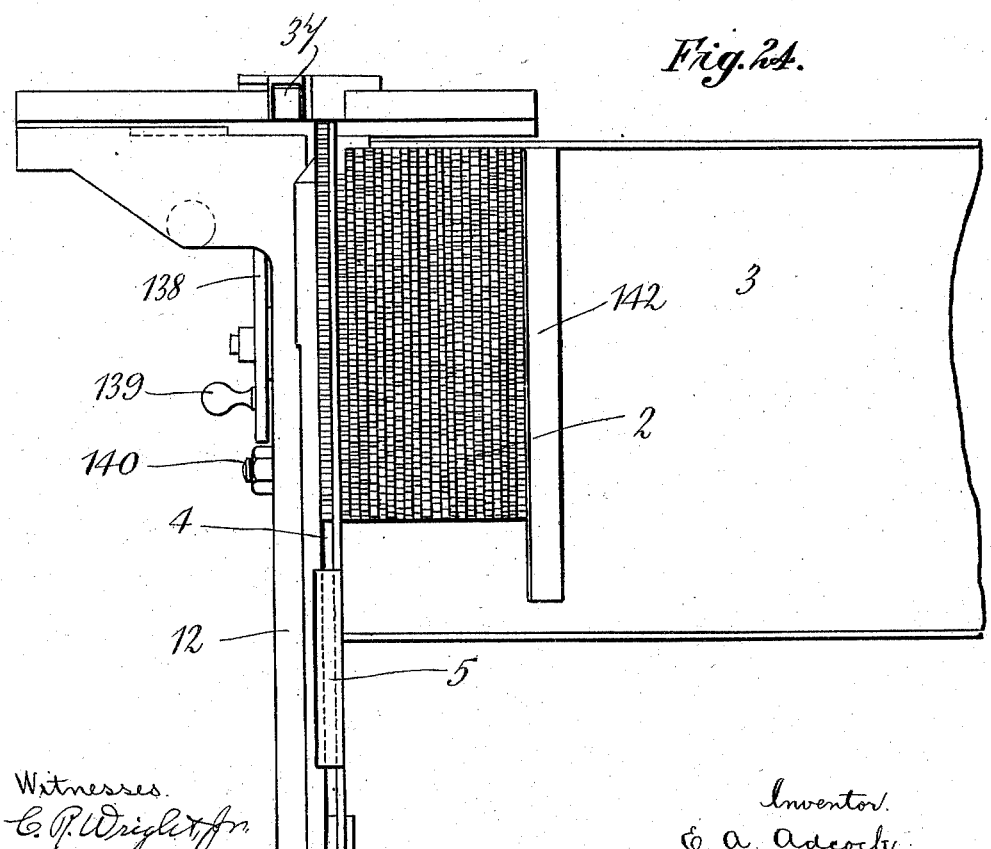

UNITED STATES PATENT OFFICE.

EDWARD AUGUSTUS ADCOCK, OF READING, ENGLAND, ASSIGNOR TO THE PULSOMETER ENGINEERING COMPANY LIMITED, OF READING, ENGLAND.

TYPE-DISTRIBUTING MACHINE.

966,979.      Specification of Letters Patent.      Patented Aug. 9, 1910.

Application filed December 28, 1908. Serial No. 469,674.

*To all whom it may concern:*

Be it known that I, EDWARD AUGUSTUS ADCOCK, a subject of the King of Great Britain and Ireland, residing at Reading, in the county of Berks, England, have invented Improvements in or Relating to Type-Distributing Machines, of which the following is a specification.

This invention relates to type distributing machines of the kind in which the types are dislodged with a movement such as is for example described in the specification of Letters Patent No. 785,649, and the distribution of the type is dependent not on special nicks or the like made in the type but upon the varying thickness of the type as described in the specification of other Letters Patent No. 701,881.

The objects of the invention are to provide improved means for preventing more than one type of a line of types being dislodged at a time in the act of distribution; to provide means for assisting the removal of the dislodged types; to provide mechanism for effecting the principal movements which, in contradistinction to being manually operated from a key board is operated by a motor after initiation from the key board; and to otherwise constitute and embody the various elements used in a type distributing machine in such manner that a machine is produced that is simpler in character and more efficient and quicker in action than the earlier machines hitherto used.

A machine embodying the invention is illustrated in the accompanying drawings whereof—

Figure 2:
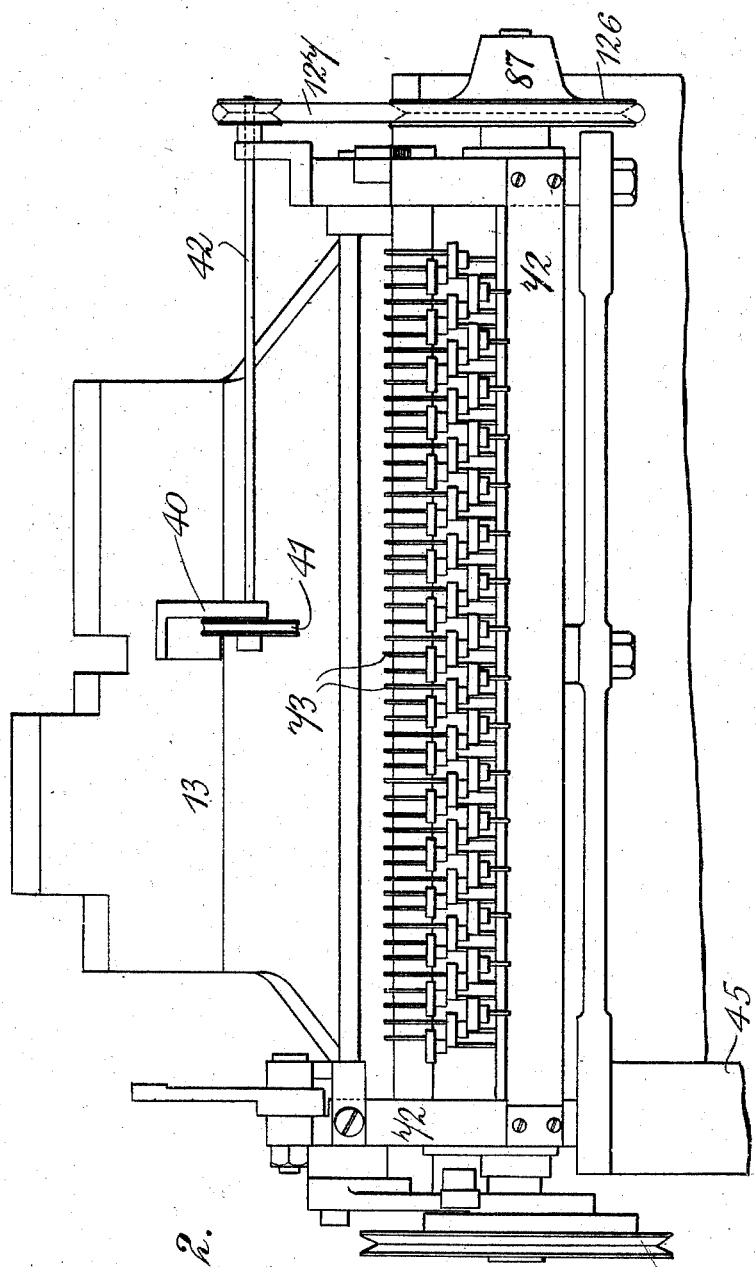
Figure 3:
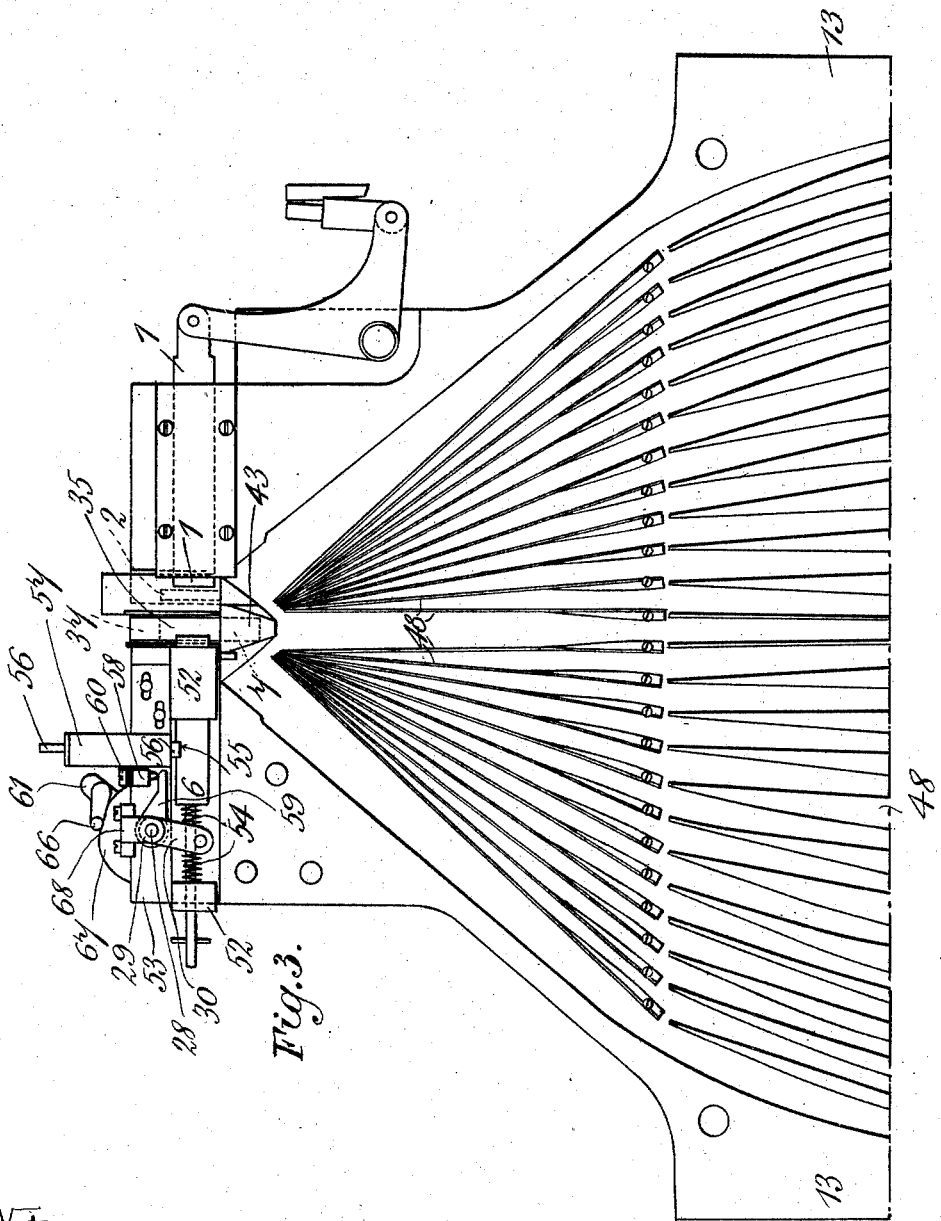
Figure 4:
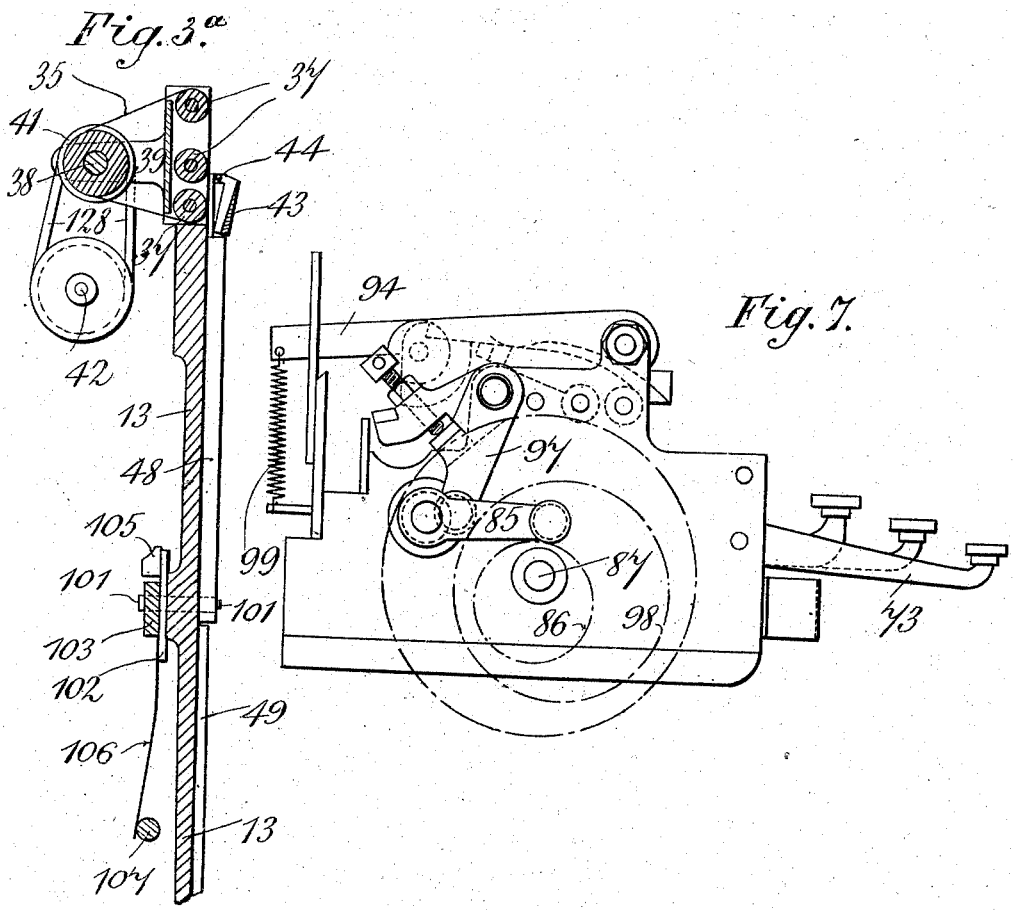
Figure 5:
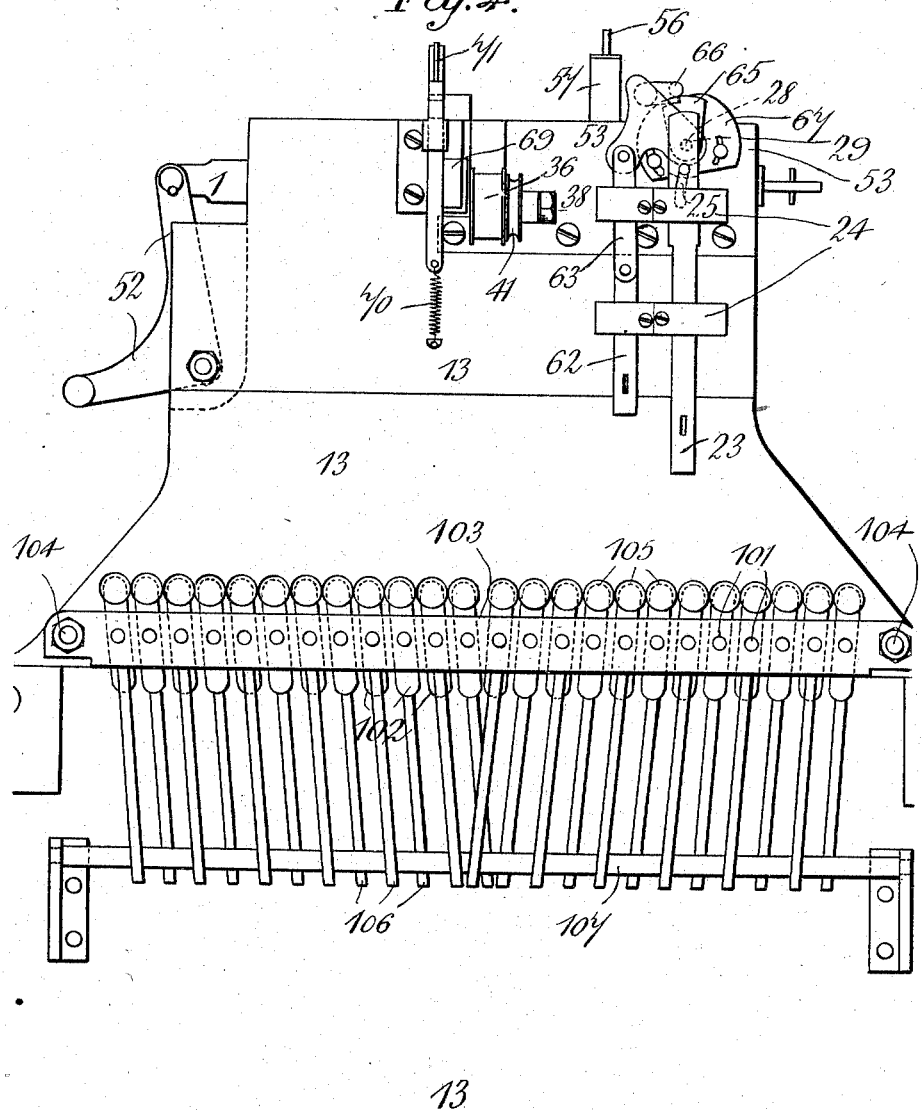
Figure 6:
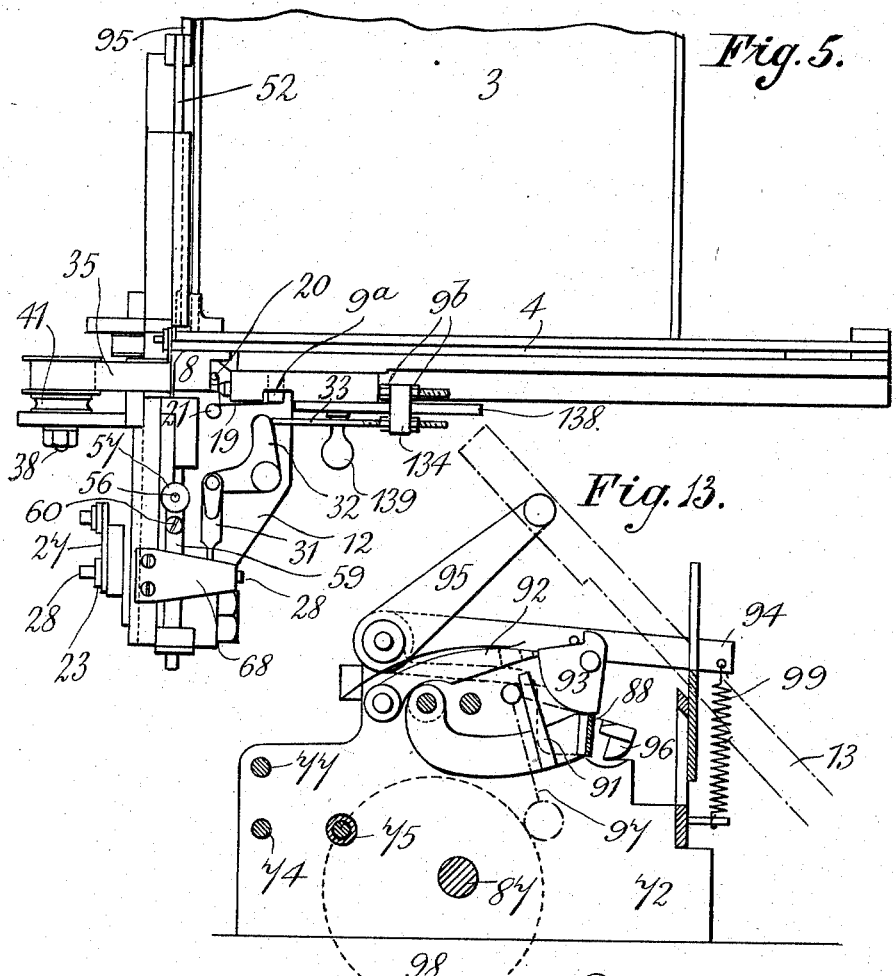
Figure 7:
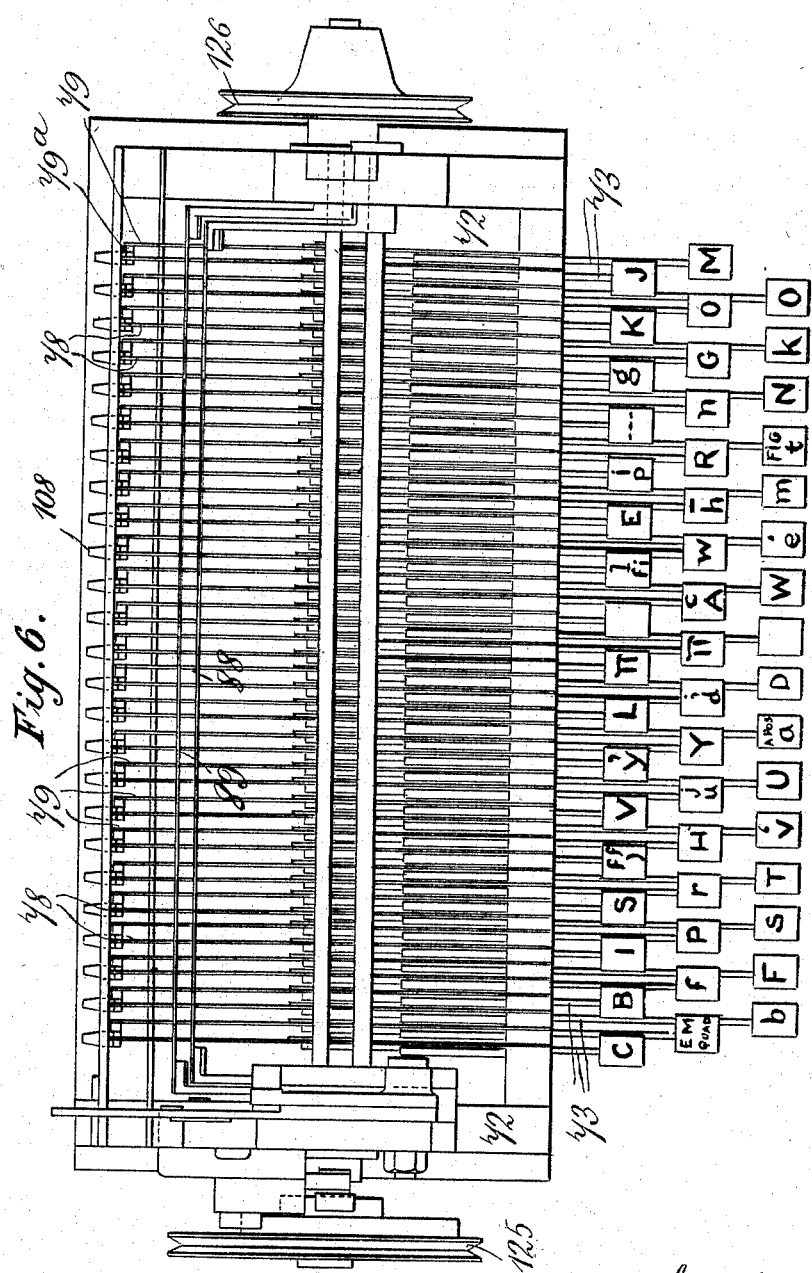
Figure 8:
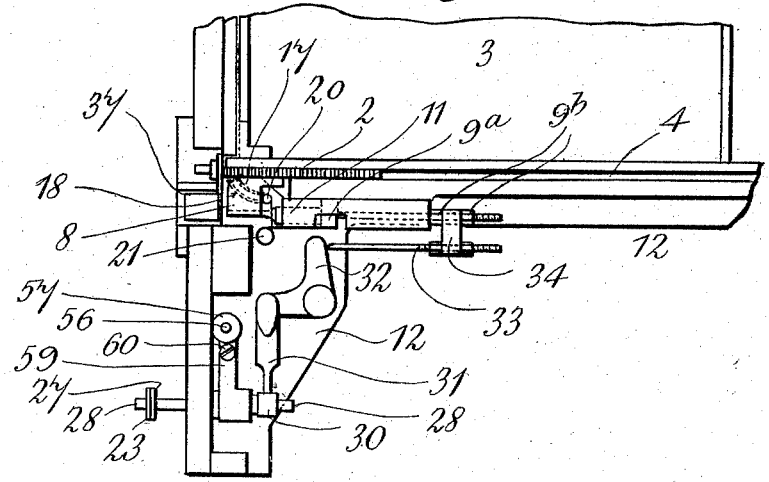
Figure 9:
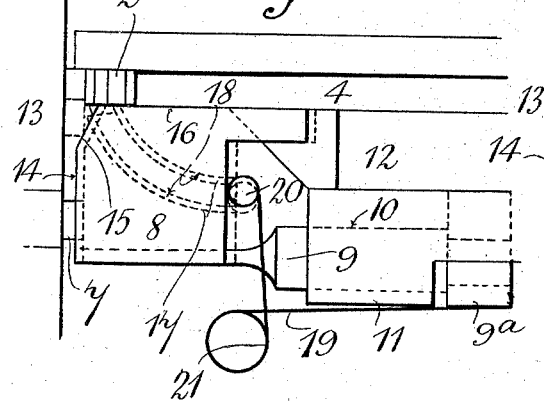
Figure 10:
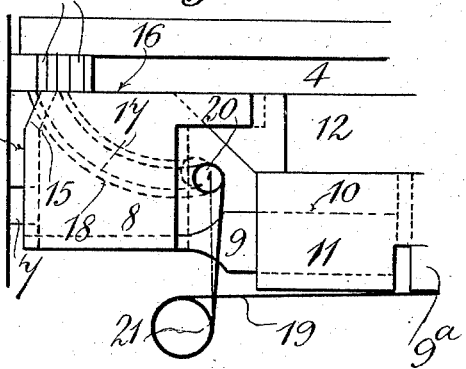
Figure 11:
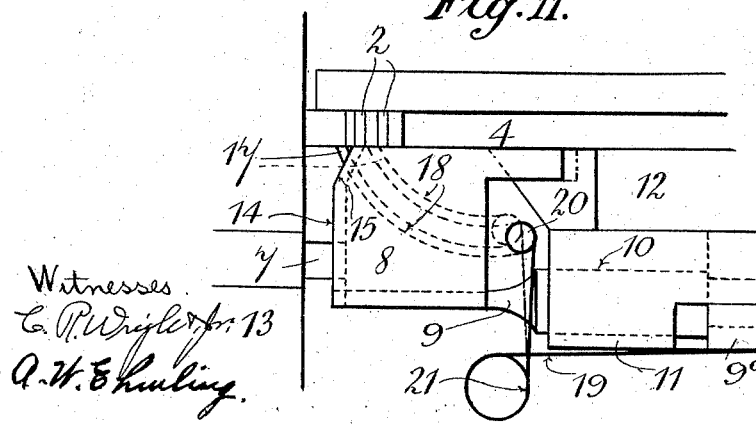
Figure 19:
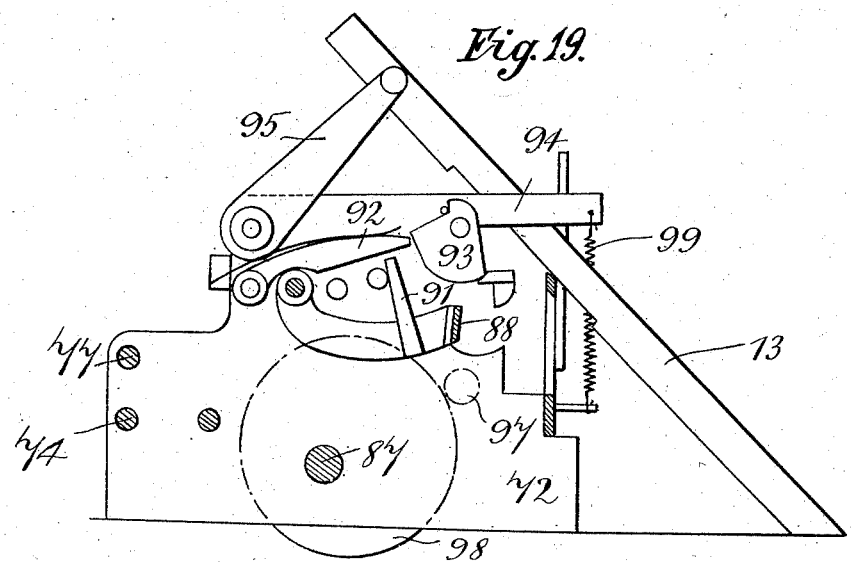
Figure 25:
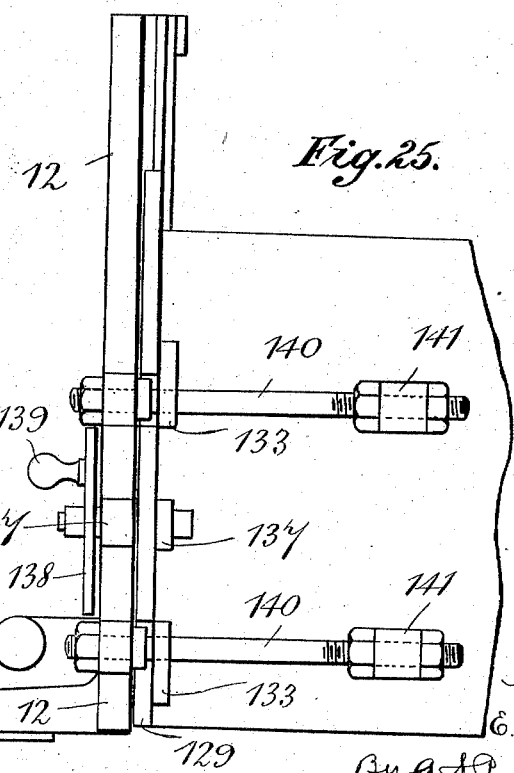

Figure 1 is a side elevation and Fig. 2 a back elevation with portions removed. Figs. 3, 4 and 5 are views of portions of Fig. 1 looking in the direction of the arrows A, B and C respectively. Fig. 3ª is a sectional view of a portion of Fig. 3. Fig. 6 is a plan of a portion of Fig. 2 and Fig. 7 is a side elevation of the same looking in the direction of the arrow D. Fig. 8 is a view similar to Fig. 5 rendering certain details clearer and Figs. 9, 10 and 11 are also similar views, to a larger scale, indicating different positions of parts. Fig. 12 is a partial view similar to Fig. 3, showing parts in a different position. Figs. 13 to 19 inclusive are views corresponding to a portion of Fig. 1 with parts in different positions as hereinafter more particularly referred to. Fig. 20 is a view to a larger scale of a portion of Fig. 1. Fig. 21 is a plan and Fig. 22 a front elevation of the same. Fig. 23 is an elevation looking in the direction of the arrow A of a portion of Fig. 1. Fig. 24 is a plan and Fig. 25 an underside view of the same. Figs. 26 and 27 are diagrammatic elevations with parts in different positions of the details shown in Figs. 23 to 25 and Figs. 28 and 29 are cross sections corresponding to Figs. 26 and 27 respectively.

The means for preventing more than one type of a line of types being displaced at a time in the act of distribution, comprises a carrier wherein are arranged guideways formed as segments of an annulus superposed one above another and some being struck with radii larger than others so that retainers of corresponding shape can be arranged therein with operative edges out of superposed alinement when the ends of the retainers on which the said edges are formed are in a common plane. In this way by providing springs to normally force the retainers into engagement with the line of types, the type which immediately follows the one that is, for the time being, being displaced will be held by one or other or two or more of the retainers, whether or not the said type which is being displaced is also so engaged by another or others of the retainers. If a type to be displaced is engaged by one or more of the said retainers, the type as it advances will automatically move the retainer or each retainer with a circular motion along its guideway against the influence of the corresponding spring, the latter returning the retainer or each retainer, to its normal position after the type is ejected. When the thicknesses of type vary considerably, the requisite retention can be effectually secured within the whole range of type thickness without increasing the number of retainers by causing the carrier to move with respect to the line of types to varying extents, in any convenient manner, by means controlled from a key board, in accordance with the character of type to be displaced.

The invention is assumed to be applied to a type distributing machine such as is described in the specification hereinbefore referred to and shown in the accompanying drawings, where a pusher 1 (Fig. 5) is moved parallel to the direction of movement of the lines of types 2 collectively along the galley 3 provided therefor, and the foremost type of a line of types that has been transferred from the said galley to a trough 4 along which it is advanced by a line follower 5, after displacement of each succeeding foremost type, is pushed, in contact with a movable abutment 6 (hereinafter called a slider), into register with an outlet 7 through which it subsequently drops. The carrier may, as shown, be formed as a block 8 (Figs. 1 and 8) attached to a rod 9 capable of sliding within a guideway 10 in a more or less hollow rectangular block 11 formed as part of a metal bracket 12 attached to what will be hereinafter referred to as the front plate 13 of the machine and which serves to carry the type galley 3 and trough 4. The carrier block 8 has a flat face 14 which approaches toward and recedes from the front plate 13 of the machine and a face 15 which is chamfered, or at an angle, connecting the aforesaid face 14 and the face 16 which is adjacent to the line of type (Figs. 9, 10 and 11).

The retainers 17 and retainer guides 18 are four in number, the uppermost and lowermost constituting one identical pair which is however arranged rather more remote from the forward end of the carrier block 8 than the intermediate pair which are also identical all as clearly seen in Figs. 9 to 11. The forward edges of both pairs of retainers 17 project beyond the line of juncture of the chamfered or inclined face 15 with the face 16. Each retainer 17 is formed as a ring segment, the center for the radius of which and the co-acting annular guide 18 is located at a point such as 17ª (Fig. 9) positioned so that a type or "space" in the act of being ejected clears the retainer by moving the latter to a much lesser extent than has hitherto been possible. The rod 9 may be formed or provided with a T piece 9ª or equivalent, to which four springs 19 are secured, individually adapted to bear against the retainers 17. Conveniently, these springs 19 may have a ring like termination 20 and be coiled intermediate of their length as at 21. The rear extremity of the rod 9 is screw threaded and provided with nuts 9ᵇ by which the position of the block 8 can be adjusted with respect to the front plate 13. In the particular example under consideration, it is intended that the adjustment shall be such that with two thin "spaces" in contact at the foremost end of the line of types, the edges of the foremost pair of retainers 17 shall extend half way across the thickness of the "space" which is more remote from the front plate 13, as shown in Fig. 9. The carrier block 8 is held in the adjusted position by a spring 22 which may be coiled around the rod 9 and react against the stationary block 11 and the T piece 9ª. With the ejection of thin "spaces" and types of a thickness not exceeding the distance between the foremost face 14 of the sliding block and the front plate 13 of the machine, no movement of the said sliding block 8 will occur. If a type of a thickness exceeding this distance but not exceeding the distance of the line of junction of the chamfered or inclined face 15 with the face 16 from the front plate 13 is ejected, the said type in the act of being displaced will, by engaging the chamfered or inclined face 15 automatically retract the sliding block 8 against the action of its spring 22, as for instance from the full line to the dotted line position shown in Fig. 9, the central pair of retainers 17 being alone engaged by the type; or to the dotted position shown in Fig. 10, the type being of a thickness to engage both pairs of retainers 17 while being ejected. If a type of a thickness greater than the distance last mentioned is to be ejected, the sliding block 8 is positively retracted by suitable means operated from the keyboard, as for example by the elevation of a bar 23 movable in slides 24 behind the front plate 13 and having a cam groove 25 in which works a pin 26 on a small crank arm 27 (see Figs. 4, 5 and 8) the spindle 28 whereof is solid and passes through a hollow spindle 29 pertaining to the slider control mechanism to be hereinafter described. To the solid spindle 28, near its other end, is fixed another crank arm 30, which, by a link 31, transmits motion to a bell crank lever 32 pivoted upon the galley supporting bracket 12, the said lever making loose contact with a rod 33 adjustably carried by a bracket 34 from the rod 9 to which the carrier block 8 of the retainers is attached. By varying the extent of elevation of the said sliding bar 23, the retainer carrying block 8 is retracted to a greater or lesser extent up to the maximum required to permit the thickest type to be displaced. Fig. 11 illustrates the sliding block 8 in one of its positively retracted positions where the type to be ejected will automatically retract it farther into the dotted line position.

In order that the types successively dislodged from the line of types shall be prevented from sticking to the front plate 13 or block 8 after retraction of the pusher 1, a device, hereinafter termed a hustler, is employed, comprising an endless band 35 continuously traveling in an opening in the front of and flush with the face of the front plate 13 and in proximity to the foremost face 14 of the retainer carrying block 8, the said band 35 being driven by a pulley 36 around which and guide rollers 37 it passes from the back to the front of the front plate 13 (Figs. 1, 3 and 3ª). This band 35, by frictional contact with a type, rapidly draws it down through the outlet opening 7 leading to the separating mechanism.

The hustler pulley 36 (Figs. 1 and 4) is loosely mounted upon a spindle 38 adjustable in slotted bearings 39 in a supporting bracket or block 40 and has secured thereto a driving pulley 41 which is suitably geared to or driven from a driving shaft 42. If desired a flapper 43 (Figs. 3, 3ª and 12) adapted to move about a horizontal axis 44, may be located immediately below and central with the hustler so that it rests upon the type as it passes to its distributing channel and restrains it to its proper path.

In the complete improved machine according to the invention, and embodying type ejecting, retaining and hustling means such as hereinbefore described, the so called front plate 13 is arranged at an angle of approximately 45 degrees to the horizontal, as shown in Fig. 1, and is removably bolted to two-part side frames 45 themselves removably connected together and to a bed plate 46 which surmounts a substantial pedestal 47. The arrangement is such that the type distributing channels 48 can be conveniently disposed upon the inclined upper or front surface of the front plate 13 while the type separating devices 49, all of which in principle are the same as those described in the specification of Letters Patent No. 701,881, can be similarly disposed upon a continuation plate 50 flush lap jointed to the front plate 13 and supported at its lower end by the type through base 51 carried by the bed plate 46. Since the type galley 3, shown in Fig. 5, is immediately behind its supporting bracket 12 and both are in consequence perpendicular to the front plate 13 while the latter is at an angle to the horizontal, the said galley 3 is likewise inclined to the horizontal, as in other constructions of type distributing machine, so that the type line follower 5 can perform its function as heretofore, by reason of the action of gravity upon its mass, and can therefore be bodily removed at will without trouble.

The type pusher 1 remains substantially the same as that described in the said former specification No. 785,649 but is actuated through its bell crank lever 52 (Fig. 4) by connections as hereinafter explained.

The slider 6 (Fig. 3) is mounted to move within guides 52ª formed in a slider bracket 53 attached to the top of the front plate 13 and is acted upon by a spiral spring 54 encircling a portion of reduced dimension passing through one of the guides. It is formed on its upper surface with a notch 55 into which a spring pressed catch 56, moving perpendicularly to the line of movement of the slider 6, automatically enters when the slider is retracted in the act of dislodging a type from the line of types. This catch 56 is carried by a bracket 57 secured to the slider bracket 53 and has a lateral projection 58 by which it can be lifted out of engagement with the notch 55 in the slider at the proper times, this being effected by engagement of a crank arm 59 fixed upon the hollow spindle 29 previously alluded to, with an adjusting screw 60 passed through the lateral projection 58 of the catch. The rocking of the hollow spindle 29 is indirectly effected by the oscillation of a crank plate 61 at the end corresponding to the end of the inclosed solid spindle 28 which carries the crank 27 governed by the cam groove 25 in the sliding member 23 hereinbefore referred to, and which is attached to a similar member 62 through a connecting rod or link 63. This crank plate 61, which is loose upon the hollow spindle 29, has a pawl 64 normally engaging a tooth upon a crank arm 65 keyed to the hollow spindle 29 and provided with a lateral pin 66 engaging a stationary but adjustable cam plate 67 by which the pawl 64 is disengaged from the crank tooth at the required instant. The hollow spindle 29 passes through a bushed hole in the slider bracket 53 and both spindles 28 and 29 are supported at their outer ends by a small bracket 68, (see Figs. 1 and 5) attached to the said slider bracket.

The machine is provided, as in other constructions, of type distributing machines, with a manually operated closed door through which quads and the like can be ejected automatically. In the machine now being described, an exit opening for 2 em and 3 em quads and the like is arranged at the end of and directly opposite to the line of type being dealt with and is closed by a sliding door 69 (Fig. 4) that is normally held closed by a spring 70 and against which the line of type bears when acted upon by the line follower 5. The door is provided with a lifting hook or handle 71 capable of being elevated and opened at will when it is desired to uncover the opening to enable quads to be automatically ejected and allowed to fall into a special quad box at the back of the machine, the exit opening however being of such a size as not to allow of the exit of type therethrough.

Referring now to the keyboard, this, as shown in Figs. 1 and 2, is supported by the uppermost portions of the side brackets 45 and is partially overhung by the front plate 13 of the machine. It comprises a rectangular casting 72 within which are mounted, in the desired order, the key levers 73, which are spaced apart so as to be capable of independent movement upon a common shaft 74 and are normally caused to bear against a stop 75 by the action of springs 76 secured on another common shaft 77 serving as the pivotal support for a series of so-called shutter levers 78 and a series of so-called hook levers 79 which collectively are equal in number to the number of key levers 73 and are suitably spaced apart. By providing the last named shaft 77 with a ratchet disk 80 (Fig. 1) and arranging a stationary pawl 81 to engage therewith, the pressure of the springs 76 upon the key levers 73 can be adjusted by rotating the said shaft 77 in one or other direction.

The casting 72 with shafts, levers and spacing means is or may advantageously be constructed to constitute a keyboard frame of the kind described in the specification of another application for Letters Patent, filed by me the 21st December 1908, Serial No. 468654. Each shutter lever 78 is capable of direct operation, under the control of a key lever 73, and also of indirect operation by a hook lever 79, under the control of a corresponding key lever, the indirect operation being effected by means of a hook 79$^a$ which is carried by the hook lever 79 and located below the lever 78 and lifts the latter when the corresponding hook lever is raised. In the example under consideration, the hook levers 79 equal the shutter levers 78 in number so that each shutter lever 78 is capable of being controlled by two keys. The ends of the several key levers 73 terminate within the key board frame 72 in a common plane and adjacent to a corresponding number of weighted tappets 82 (Figs. 15 and 16) each capable of turning loosely upon a pivot 83 secured to either a shutter lever 78, or hook lever 79, with respect to each of which tappets 82, the adjacent end of a corresponding key lever 73 acts as a pawl to normally maintain the tappet 82 out of the path of movement of a swing plate 84 which is continuously oscillated by engagement of a roller fitted crank arm 85 (Fig. 7), secured to one of the pivots of the swing plate, with a cam 86 upon a continuously rotating spindle 87 journaled in the side brackets of the key board frame and driven by power.

Arranged above the shutter and hook levers 78, 79, so that they are capable of independent movement about pivots, are two cradles 88, 89 (Fig. 14), one of which viz. 88, is normally engaged by all the levers 78, 79 so that it moves with movement of any single lever, while the other, viz. 89, is denticulated to varying depths so that it is moved only by certain of the levers and to varying extents. The cradle 88 (Figs. 14 to 19), is provided with an arm 90 which engages and serves to elevate the sliding bar 62, before referred to, which effects release of the slider 6 of the machine, and likewise carries an arm 91 which, after release of the said slider 6, engages a spring pressed pivotal arm 92 acting as a pawl for a weighted tappet 93 pivoted to one arm 94 of a bell crank lever the other arm 95 of which is connected to the crank 52 (Fig. 3) of the type pusher 1. This spring pressed pawl 92 when moved, permits the tappet 93 to move into the path of a subsidiary swing bar 96 (Figs. 13 and 18) which is adapted to lift the bell crank lever 94—95 against the action of its spring 99, the said bar being oscillated by an adjustable bell crank one arm 97 of which engages another cam 98 on the said continuously rotating spindle 87 of the machine. A spring 99 secured to the free end of the arm 94 of the bell crank 94—95, returns the type pusher 1 and its attached parts to the original position as the cam 98 permits (Fig. 14).

The second cradle 89 carries an arm 100 (Fig. 1) which engages and serves to elevate the sliding bar 23 pertaining to the type retainers 17, the varying movement of the said cradle varying the position of the carrier block 8 of the type retainers to suit the type to be ejected.

The shutters 48 (Fig. 3) constituting the type distributing channels on the face of the front plate 13 are fixed at their lower ends to short spindles 101 (Fig. 4) which extend through the front plate 13, the said shutters being arranged, as before, to converge generally toward the outlet opening 7 through which the individual types are ejected. Each shutter spindle 101 is provided with a double arm 102 at a point between its ends so that the whole of the spindles can conveniently be secured by a bearing bar 103 attached to the back of the front plate 13 by pillar studs 104. Each double arm 102 is provided at one end with a button 105 and at the other with a flat steel or other metal spring 106 adapted to rub lightly along a friction retaining bar 107. These springs 106 are arranged so that each alternate spring engages one side of the bar while the remainder engage the opposite side. The end of each shutter lever 78 (Fig. 6) is provided with a wedge-shaped head 108 adapted, when the lever is elevated, to advance between two adjacent buttons 105 on the double arms 102 pertaining to the shutters 48 and separate the same in the usual way, well known, to form a passageway for the type (Fig. 12) if they are not already separated, which latter will be the case if either a shutter lever 78, or a corresponding hook lever 79, be operated one directly after another.

The type sifting devices may be of the kind described in the said former specification No. 701881 but, as it is desired in the specific example of machine described, to operate each shutter 48 only by two keys, 73, provision will only be made for separating two types received from each distributing channel, except in cases where a single key is arranged to be operated for more than one type, in which case provision will be made for separating three or it may be more types received from a distributing channel.

The partitions 49 of the type sifting devices, as before, register with the dividing lines of type troughs constituted by strips 109 fixed to the base 51 supported by the bedplate 46 previously referred to (see Figs. 20 to 22), the types, as they fall from the sifting devices, being forced by a packer 110 past a comb 111 of elastic material, such as rubber, supported between clamping plates 112 secured toward the lower edge of the supporting plate 50 of the sifting devices so that the said types are prevented from falling back into the grooves of the sifter as the packer 110 recedes from them.

The type packer 110 comprises a toothed member advanced and retracted by eccentrics 113 upon a continuously driven shaft 114 mounted in bearings 115 upon the base plate 46 of the machine at the back of the front plate, the several teeth extending into the troughs at their junction with the sifting devices.

It will here now be appropriate to describe the means for driving the several parts to be driven. The mechanism comprises a spindle 116 (Figs. 1 and 2) bolted or otherwise secured to the machine, as, for instance to the portion of the side frame 45 which directly surmounts the main bed plate 46. On the spindle is arranged a loose pulley 117 and a driving pulley 118, a fork or striker 119 being employed to shift the driving belt from one pulley to the other in starting and stopping the machine. The driving pulley 118 has a sleeve 120 wherein a groove 121 is cut acting as a pulley for a cord 122 (Fig. 1) leading to a corresponding pulley 123 upon one end of the spindle 114 of the type packer 110. Another groove 124 in the sleeve acts as a pulley for a cord leading to a corresponding pulley 125 on one end of the cam shaft 87 pertaining to the key board (Fig. 2), while a similar pulley 126 at the opposite end of the said shaft 87 drives, through a cord 127, a counter shaft previously referred to as a driving shaft 42, journaled at the back of the front plate 13 and in turn adapted to drive, by a cord, 128, the pulley 41 secured to the hustler pulley 36.

For transferring a line of types from the galley 3 to the feed trough 4, a sliding riser 129 (Figs. 26 to 29) is employed in a space between the galley 3 and the bracket 12 to which the galley is secured, the said riser 129 having bosses 130 and projecting pins 131 arranged to slide in slots 132 in rectangular or other bosses 133 on the type galley 3. To the lower portion of the riser 129 is secured a toothed rack 134 with which engages a pinion 135 fixed to one end of a spindle 136 mounted in bearings 137 on the bracket 12 and galley 3 and having a hand wheel 138 and handle 139 by which it can be rotated to cause the riser 129 to be lowered against the action of a spring or springs not shown. The galley 3 is attached to the bracket 12 by means of bolts 140 which pass through bosses 133 and other bosses 141, as shown more particularly in Fig. 25.

The action of the machine is as follows:— Assuming the types 2 to be distributed to be placed in the galley 3 (Figs. 1, 2 and 4), then by turning the hand wheel 138 through an angle of 180° from the position shown in Fig. 1, the riser 129 is lowered from the position shown in Fig. 28 to the position shown in Fig. 29 to permit a line of types to be advanced by a line follower or feeder 142 in any ordinary way into the path of the riser 129 which, when the hand wheel 138 is liberated, is elevated by its spring or springs to move the line of types into the feed trough 4. The weighted line follower 5 previously removed, is then placed in the trough 4 (see Figs. 1, 23, 24) and the machine started by shifting the belt striker 119 if the machine is not already in motion. The distribution of the type is then effected as usual by operation of the appropriate keys 73 of the key board, any one of which, whether it pertains to a shutter lever 78, or a hook lever 79, will liberate a tappet 82 and permit the same to move into the path of the oscillating swing bar 84, as shown in Fig. 16. The movement of this bar 84 in one direction will then cause the lever 78 or 79 which carries the tappet to be elevated and in so doing cause it, if it be a shutter lever 78, to move the shutters 48, if their position requires alteration, or if it be a hook lever 79, to lift its companion shutter lever 78 for the same purpose (position Fig. 17). At the same time, the cradle 88 directly connected with the slider catch mechanism 90, 62, 63, 61, 66, 65, etc., will operate to release the slider 6 and at a later period dislodge, through the rod 91, the pawl 92 which normally retains the tappet 93 of the type pusher operating mechanism 94, 95, 52, etc., out of the path of the subsidiary swing bar 96. When this tappet enters the said path, (position Fig. 18) the movement of the swing bar 96 in one direction will cause the bell crank 94—95 which carries it to be elevated (position Fig. 19) and advance the type pusher 1. If a shutter, or a companion hook lever 78 or 79, pertaining to a type or types of a thickness greater than that for which the retainers 17 are adjusted be set in motion, then the cradle 89 connected to the mechanism 100, 23, 25, 27, etc., for altering the position of the carrying block 8 of the retainers is moved to a certain extent. The mode of ejecting and separating or sifting the individual types will be readily understood from the earlier part of the description and the previous specifications quoted.

As a few of the letters of the alphabet and some logotypes are but seldom used, keys for these need not necessarily be provided, it being sufficient to provide say two keys 73, marked for example with the Greek symbol (see Fig. 6), arranged to control levers, say a shutter lever and a hook lever, by which all the specifically excluded types are ejected from the line into a pie channel to be subsequently separated by hand.

What I claim is:—

1. In a type distributing machine, means for preventing more than one type of a line of types being displaced sidewise at a time, comprising, in combination, a carrier wherein are arranged curved guideways, yielding retainers arranged to move circularly in said guideways so that the type which immediately follows the one that is, for the time being, being displaced, will be held by one or other or two or more of the retainers whether or not the said type which is being displaced is also so engaged by another retainer or retainers.

2. In a type distributing machine, means for preventing more than one type of a line of types being displaced sidewise at a time, comprising, in combination, a carrier wherein are arranged guideways formed as segments of an annulus and yielding retainers arranged to move circularly in said guideways so that the type which immediately follows the one that is, for the time being, being displaced, will be held by one or other or two or more of the retainers whether or not the said type which is being displaced is also so engaged by another retainer or retainers.

3. In a type distributing machine, means for preventing more than one type of a line of types being displaced at a time, comprising a movable carrier wherein are arranged guideways formed as segments of an annulus, yielding retainers in said guideways resisting displacement of the types, and spring means resisting movement of the carrier and against which means the carrier is moved automatically by types exceeding certain predetermined thicknesses but not attaining other predetermined thicknesses.

4. In a type distributing machine, means for preventing more than one type of a line of types being displaced at a time, comprising a movable carrier wherein are arranged guideways formed as segments of an annulus, yielding retainers in said guideways resisting displacement of the types, spring means resisting movement of the carrier and means for positively moving the said carrier against the action of the spring means.

5. In a type distributing machine, means for preventing more than one type of a line of types being displaced at a time, comprising a movable carrier wherein are arranged guideways formed as segments of an annulus, yielding retainers in said guideways resisting displacement of the types, spring means resisting movement of the carrier and against which the carrier is moved automatically by types exceeding certain predetermined thicknesses but not attaining other predetermined thicknesses, and means for positively moving the said carrier while ejecting types exceeding the last named excluded thicknesses.

6. In a type distributing machine, the combination with a type trough, of a carrier forming part of one wall thereof and having superposed segmental guideways therein, segmental retainers in said guideways and springs maintaining the retainers with the retaining edges in the plane of the said wall of the type trough.

7. In a type distributing machine, the combination with a type trough, of a carrier forming part of one wall thereof and having superposed guideways with edges out of superposed alinement, segmental retainers in said guideways and springs maintaining the retainers with their retaining edges in the plane of the said wall of the type trough.

8. In a type distributing machine, the combination with a type trough, means for individually displacing type from a line of type in the trough, and a body having a discharge opening therein for the displaced type, of a hustler adapted to engage a face of the type which is coincident with the plane of its motion and frictionally engage the displaced type and accelerate its motion downward through the discharge opening, and yielding means pressing the type against the hustler.

9. In a type distributing machine, the combination with a type trough, means for individually displacing type from a line of type in the trough and separating mechanism for receiving the displaced type, of a hustler comprising an endless band adapted to frictionally engage the displaced type, and cause it to enter the separating mechanism, and means for continuously moving said band through an outlet opening leading to the separating mechanism.

10. In a type distributing machine, a front plate inclined to the horizontal and having type distributing channels upon its upper surface, a type galley perpendicular thereto and arranged to one side thereof, a type trough in communication with and at a higher level than said galley, and a type line follower in the trough performing its function by reason of the action of gravity upon its mass.

11. In a type distributing machine, a front plate inclined to the horizontal and having type distributing channels upon its upper surface, a bracket secured to the plate and having an outlet opening therein leading to the type distributing channels, a type galley secured to the bracket and perpendicular to the front plate, a type trough in communication with the galley, a gravitating type line follower in the trough, and means for individually displacing type from the trough and bringing the same over the outlet opening in the bracket.

12. In a type distributing machine, a front plate inclined to the horizontal and having type distributing channels upon its upper surface, a bracket secured to the plate and having an outlet opening therein leading to the type distributing channels, a type galley secured to the bracket and perpendicular to the front plate, a type trough in communication with the galley, a gravitating type line follower in the trough, means for individually displacing type from the trough and bringing the same over the outlet opening and a hustler adapted to frictionally engage the displaced type and draw it through the opening in the said bracket.

13. In a type distributing machine, a front plate inclined to the horizontal and having type distributing channels upon its upper surface, a bracket secured to the plate and having an outlet opening therein leading to the type distributing channels, a type galley secured to the bracket and perpendicular to the front plate, a type trough in communication with the galley, a gravitating type line follower in the trough, means for individually displacing type from the trough and bringing the same over the outlet opening, a hustler comprising an endless band adapted to frictionally engage the displaced type and means for continuously traveling said band through the outlet opening leading to the distributing channels.

14. In a type distributing machine, a front plate inclined to the horizontal, a continuation plate flush lap jointed to said front plate, a type trough base supporting the continuation plate and a bed plate carrying the type trough base.

15. In a type distributing machine, a bed plate, a key board, side brackets supported by the bed plate and supporting the keyboard, an inclined front plate partially overhanging the keyboard, type distributing channels upon its upper surface, a type galley perpendicular to said plate and arranged to one side thereof, a type trough in communication with the galley, a type line follower in the trough performing its function by reason of the action of gravity upon its mass, and means for individually displacing type from said trough.

16. In a type distributing machine, an inclined type line trough, a gravitating type line follower therein, a support arranged at the delivery end of said trough and formed with an exit opening for 2 em and 3 em quads and a door arranged to slide endwise and normally close said opening and against which the line of type in the trough normally bears, said door being adapted to be lifted by hand when required for ejecting said quads after the type has been dealt with.

17. In a type distributing machine, an inclined type trough, a gravitating type line follower therein, a support for the trough having an exit opening in line with the line of type therein and of a size to allow of the passage of 2 em and 3 em quads but not of types, a door normally closing said opening and means for opening said door by hand when ejecting 2 em and 3 em quads.

18. In a type distributing machine, an inclined type trough, a gravitating line follower therein, a support for the trough, having an exit opening in line with the line of type therein, said opening being of a size to admit of the exit of 2 em and 3 em quads but not of type, a door closing said opening, a spring normally maintaining the door closed, and lifting means for opening the door when ejecting 2 em and 3 em quads.

19. In a type distributing machine, a galley, a type line trough in communication therewith, means for displacing type individually from said trough, a slider in contact with which a displaced type is pushed, a guide for said slider, a spring opposing movement of said slider in one direction, a spring pressed catch for holding the slider in its retracted position, means for disengaging said catch when a type is to be ejected, a carrier forming part of one wall of the trough and having superposed segmental guideways therein, segmental retainers in said guideways, and springs for maintaining the retainers with their retaining edges in the plane of the said wall of the trough and adapted to prevent more than one type of a line of types being displaced sidewise at a time.

20. In a type distributing machine, a keyboard comprising a series of key levers, a series of shutter levers and a series of hook levers collectively equal in number to the key levers, means for directly operating the shutter levers by certain key levers, and means for indirectly operating the said shutter levers from the hook levers of the remaining key levers.

21. In a type distributing machine, a galley, a type line trough in communication therewith, a pusher for displacing type individually from said trough, a slider in contact with which the displaced type is pushed, a keyboard, and means for actuating the slider and pusher, comprising a cradle adapted to be moved with the operation of each key lever, a bar on the cradle, mechanism connected to said bar for releasing the slider, a crank lever connected to the type pusher, a weighted tappet pivoted to said crank lever, a spring pressed pivotal arm acting as a pawl for the tappet, a second bar on the cradle engaging the pawl after the slider is released and a swing bar into the path of which the weighted tappet is moved to operate the pusher.

22. In a type distributing machine, a galley, a type trough in communication therewith, a pusher for displacing type individually from such trough, a slider in contact with which the displaced type is pushed, a keyboard, a cradle in said keyboard adapted to be moved with the operation of each key lever, a bar on the cradle, mechanism connected to said bar for releasing the slider, a crank lever connected to the type pusher, a weighted tappet pivoted to said crank lever, a spring pressed pivotal arm acting as a pawl for the tappet, a second bar on the cradle engaging the said pawl after the slider is released, a swing bar into the path of which the weighted tappet is moved to operate the pusher, a continuously rotating spindle in the keyboard, a cam thereon and an adjustable bell crank arm connected to the swing bar and operated by the cam.

23. In a type distributing machine, a galley, a type trough in communication therewith, a pusher for displacing type individually from such trough, a slider in contact with which the displaced type is pushed, a keyboard, a series of shutter levers and a series of hook levers, weighted tappets pivoted to the shutter and hook levers, a series of key levers acting as pawls for said tappets, a swing plate adjacent to the tappets, a cradle adapted to be moved by each of the shutter and hook levers, a bar on the cradle, mechanism connected to said bar for releasing the slider, a crank lever connected to the type pusher, a weighted tappet pivoted to said crank lever, a spring pressed pivotal arm acting as a pawl for the last mentioned tappet, a second bar on the cradle engaging the said pawl after the slider is released, a subsidiary swing bar into the path of which the last mentioned weighted tappet is moved to operate the pusher, a continuously rotating spindle in the keyboard, two cams thereon, an adjustable bell crank arm connected to the subsidiary swing bar and operated by one cam and a roller fitted crank arm connected to the swing plate and operated by the other cam.

24. In a type distributing machine, the combination with a keyboard comprising a series of shutter levers, a series of hook levers and a series of key levers, a type trough, means for displacing types individually therefrom and a movable device carrying retainers for preventing displacement of more than one type at a time, of a denticulated cradle adapted to be moved only by certain of the key levers of the key board and to varying extents and connections between said cradle and movable device carrying the type retainers for imparting variable movement to such device.

25. In a type distributing machine, the combination with a keyboard comprising a series of shutter levers, a series of hook levers and a series of key levers, means for displacing types individually from a line of types, means for separating the displaced types and retaining means for preventing displacement of more than one type at a time, of a cradle and type displacing and separating means movable with operation of each of the key levers and a denticulated cradle controlling the type retaining means movable only with operation of certain of said key levers.

26. In a type distributing machine, a keyboard, a series of key levers therein, a series of shutter levers and a series of hook levers collectively equal in number to the key levers, the hook levers being arranged to indirectly operate the shutter levers.

27. In a type distributing machine, means for separating types individually displaced from a line of types, comprising a front plate inclined to the horizontal, a series of distributing channels on its upper surface, a series of channel shutters, spindles passing through said plate and upon which the shutters are fixed, double arms on said spindles at the back of the plate, a bearing bar supporting the spindles, a button at one end of each arm by which it can be oscillated, a flat spring at the other end of each arm and a friction retaining bar along which the springs rub when the arms are oscillated.

28. In a type distributing machine, means for separating types individually displaced from a line of types, comprising a front plate inclined to the horizontal, a series of distributing channels on its upper surface, a series of channel shutters, spindles passing through said plate and upon which the shutters are fixed, double arms on said spindles at the back of the plate, a bearing bar supporting the spindles, a button at one end of each arm by which it can be oscillated, a flat spring at the other end of each arm and a friction retaining bar engaged upon opposite sides by the springs of alternate arms.

29. In a type distributing machine, the combination with a keyboard, of a series of key levers therein, a series of shutter levers and a series of hook levers collectively equal in number to the key levers, and means for separating types individually displaced from a line of types, comprising an inclined front plate partly overhanging the keyboard, a series of type distributing channels upon its upper surface, a series of channel shutters, spindles passing through said plate and upon which the shutters are fixed, double arms on said spindles at the back of the plate and arranged adjacent to the shutter levers, a bearing bar supporting the spindles, a button at the upper end of each arm adapted to be engaged by a shutter lever, a flat spring at the lower end of each arm and a friction retaining bar along which the springs rub when the arms are moved by the shutter levers.

30. In a type distributing machine, the combination with type sifting devices, an inclined plate supporting said devices and a trough for receiving the sifted types, of a type packer and a comb of elastic material supported by the inclined plate above the comb and trough.

31. In a type distributing machine, the combination with type sifting devices, an inclined plate supporting said devices and troughs for receiving the sifted types, of a type packer comprising a toothed member, eccentrics for reciprocating said member, a continuously driven shaft carrying the eccentrics, and a comb of elastic material secured above the lower ends of said sifting devices as set forth.

32. In a type distributing machine, the combination with type sifting devices, an inclined plate supporting said devices and troughs for receiving the sifted type, of a type packer comprising a toothed member, eccentrics for reciprocating said member, a continuously driven shaft carrying the eccentrics, and a comb of elastic material supported by the inclined plate above the toothed member and troughs.

33. In a type distributing machine, means for displacing types individually from a line of types, a hustler engaging each type displaced, means for separating the types engaged by the hustler, means for sifting the separated types, troughs into which the sifted types are packed, a packer for packing said types in the troughs, a keyboard with mechanism for controlling the type displacing and separating means, and means for continuously operating the hustler, the packer and the keyboard mechanism.

34. In a type distributing machine, a type galley, a trough in communication therewith, a bracket supporting said galley and trough, a sliding riser arranged between the galley and bracket, springs arranged to oppose lowering movement of the riser, a toothed rack secured to the riser, a spindle carried by the bracket, a pinion on said spindle engaging the rack and a hand wheel on the spindle for lowering the riser against the action of the springs.

35. In a type distributing machine, a bed plate, a front plate inclined to the horizontal and carried by said bed plate, a bracket mounted upon the upper surface of said plate, a galley, bosses on the underside of said galley and bolts passing through the said bosses and bracket for securing the galley.

Signed at London, England, this 9th day of December 1908.

EDWARD AUGUSTUS ADCOCK.

Witnesses:
W. CROSS,
F. J. BROUGHAM.